United States Patent [19]

Hardesty

[11] 4,307,822
[45] Dec. 29, 1981

[54] METERED DISPENSER

[76] Inventor: Robert Hardesty, Rte. 1, Box 39, Spangle, Wash. 99031

[21] Appl. No.: 53,080

[22] Filed: Jun. 28, 1979

[51] Int. Cl.³ .......................... A01C 7/18; A01C 19/00
[52] U.S. Cl. ..................................... 222/352; 222/330; 222/368
[58] Field of Search ............... 222/352, 349, 351, 368, 222/410, 412, 330, 623-625; 221/266

[56] References Cited

U.S. PATENT DOCUMENTS

| | | |
|---|---|---|
| 254,957 | 3/1882 | Grow . |
| 982,018 | 1/1911 | Patric . |
| 998,000 | 7/1911 | Hermann et al. ............... 222/368 X |
| 1,260,219 | 3/1918 | Long ................................... 222/412 |
| 1,358,927 | 11/1920 | Belcher ........................... 221/266 X |
| 2,278,948 | 4/1942 | Rodli et al. ..................... 222/349 X |
| 2,345,804 | 4/1944 | Gemberling et al. .......... 222/330 X |
| 3,053,418 | 9/1962 | Jordan . |
| 3,190,506 | 6/1965 | Selzler ............................. 222/330 X |
| 3,554,145 | 1/1971 | Hornung . |
| 3,620,423 | 11/1971 | Dalgleish ........................ 222/412 X |
| 3,763,797 | 10/1973 | Navasero ........................ 222/330 X |

Primary Examiner—David A. Scherbel
Attorney, Agent, or Firm—Wells, St. John & Roberts

[57] ABSTRACT

A device for receiving and dispensing metered quantities of loose material. The dispenser includes an upright open hopper having a rotatable metering shaft journaled below downwardly converging hopper walls. A helical feed groove or a series of indentations aligned in a helical path along the metering shaft receive material from the hopper upon rotation of the shaft and discharge it in the metered quantities below. Wipers are provided on opposite sides of the metering shaft and extend from the hopper walls to rub against the shaft periphery in order to control the amount of material received and delivered through the helical groove or indentations.

5 Claims, 13 Drawing Figures

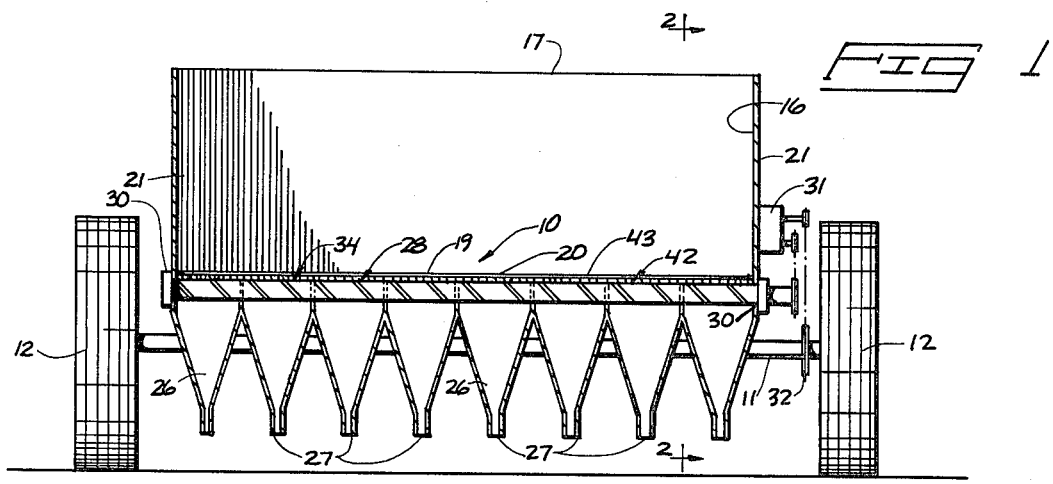
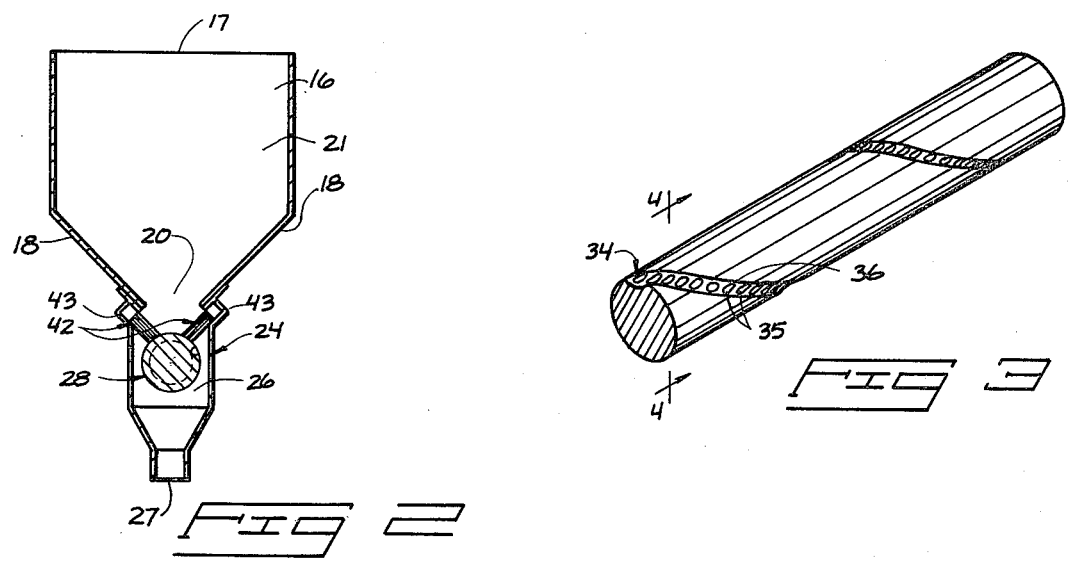
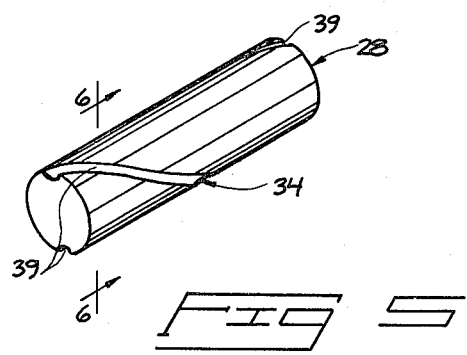
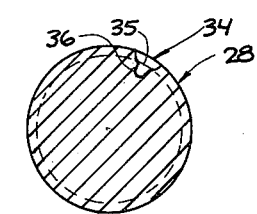

METERED DISPENSER

BACKGROUND OF THE INVENTION

The present invention is related to dispensing apparatus with a metered discharge to feed a selected amount of loose material at a controlled rate dependent upon rotation of a metering element.

There are several forms of metered dispensing apparatus currently available and in predominant use in the agricultural industry for planting seeds and dispensing powdered fertilizer.

One form of metered dispensing apparatus makes use of a hopper with converging walls leading to an axial vane type metering shaft. The vanes are equiangularly spaced about the axis of the shaft. The shaft is usually housed within a semi-circular portion of the hopper that is in open communication with the hopper interior and discharge. Where several laterally spaced rows of material are to be dispensed from the hopper, the same vane metering shaft may extend across the full hopper width, servicing all of the discharge openings in unison.

Hoppers with multiple spaced discharge openings and with the vane type metering devices are very difficult to clean. For example, when a hopper has been utilized to apply a granulated weed killer, it becomes very desirable to completely clean the weed killer from the hopper prior to using the hopper for the application of seed. The difficulty is that the area between the discharge openings cannot be easily moved axially to the discharge openings. The vanes of the metering device cover the area between discharge openings and thereby prevent access for cleaning purposes. The vaned meter must therefore be rotated slowly several times while the material is being swept toward the discharge openings. This is obviously a tedious process.

U.S. Pat. No. 982,018 to C. E. Patric discloses a planting machine having a rotating distributing wheel with peripheral indentations rather than axial vanes for receiving seeds. The indentations are spaced angularly in a circular path about the wheel. Metal-to-metal frictional contact is made between the hopper and the rotating distributing wheel.

U.S. Pat. No. 254,957 to F. J. Grow illustrates a wheat feeder utilizing an axial vane metering device that is shaped somewhat like a ratchet wheel in cross section. Brushes are utilized to regulate and equalize flow of wheat through the vaned metering device.

U.S. Pat. No. 3,053,418 to Jordan discloses a seed sowing machine that utilizes, as a metering device, two pipes, one inside another. The outer pipe has two annular rows of holes spaced about the periphery. The holes of one row are staggered about the periphery in relation to holes of the other row. The inside pipe forms a base for the holes so seed will not fall through. The holes do not span the width of the hopper and the metering device rotates within a rigid housing at the bottom end of a hopper.

U.S. Pat. No. 3,055,145 to M. C. Hornung discloses a seed and fertilizer metering device. The metering device includes an elliptical groove formed about the shaft that fits in a mating cylindrical journal. The journal is slotted at the bottom side to allow feed through the elliptical groove. The feed material, if sufficiently flowable, could feed continuously through the open groove in both directions about the central rotational axis. The metering shaft is also in close proximity to the journal.

The present dispenser makes use of a helical metering arrangement that extends fully across the width of the associated hopper to accurately and consistently deliver metered amounts of material through one or more discharge orifices. Care is taken that the material does not meet with shearing forces between the metering shaft and hopper walls. The dispenser will automatically clean itself without requiring extra effort on the part of the operator.

BRIEF DESCRIPTION OF THE DRAWINGS

FIG. 1 is a fragmented cross-sectional view of the present dispenser;

FIG. 2 is a cross-sectional view taken along line 2—2 in FIG. 1;

FIG. 3 is a pictorial detail view of a metering shaft section;

FIG. 4 is an enlarged sectional view of the shaft taken along line 4—4 in FIG. 3;

FIG. 5 is a pictorial view of the metering shaft with an alternate feed arrangement;

DETAILED DESCRIPTION OF A PREFERRED EMBODIMENT

Figure 6:
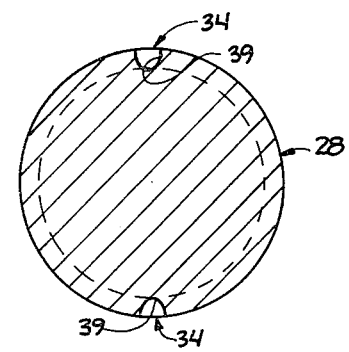
FIG. 6 is an enlarged sectional view of the shaft taken along line 5—5 in FIG. 5.
Figure 7:
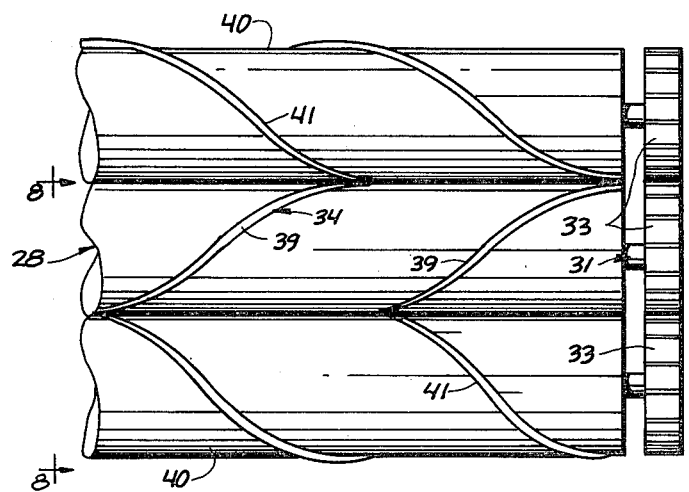
FIG. 7 is a fragmentary plan view of the FIG. 5 form of shaft with side rollers and drive mechanism.

The present invention is comprised of a dispenser 10 utilized for receiving loose material such as powder or granular material and for accurately dispensing metered quantities of the material. Although the device will function serviceably in many applications, it is preferred that the device be used in the agricultural industry for the purpose of planting seeds and for distributing fertilizer or other loose material in a closely measured quantity along the ground surface. For this purpose, the present dispenser is shown in FIG. 1 mounted to a frame 11 and is movably supported by at least one pair of wheels 12.

The present dispenser 10 includes an upright hopper 16 for receiving the loose material to be distributed. The hopper 16 includes an open upper end 17 with side walls 18 (FIG. 2) converging downwardly. The side walls 18 terminate at bottom ends 19. The bottom wall ends 19 define an elongated opening 20 that extends across the full width of the hopper. Upright end walls 21 connect the converging side walls 18 at opposite ends of the hopper. The end walls 21 also define the opposed ends of the elongated opening 20.

A chute means 24 may be situated below the opening 20 for receiving metered material and directing it to specific locations along the width of the hopper. The chute means 24 may be comprised of a series of manifolds that are funnel-shaped as shown in FIG. 1. Adjacent manifolds share common partition walls 26 that may extend upwardly to ends adjacent the opening 20. These walls 26 divide the hopper and its discharge so that metered material is segregated into pre-determined measured amounts and deposited successively into the several manifolds. The deposited material is directed along the converging walls of the manifolds through downwardly projecting discharge spouts 27. The spouts 27 may be spaced as desired across the width of the hopper, usually in equal increments for the purpose of depositing equally-spaced rows of seeds or other materials in agricultural applications.

A metering shaft 28 is provided within the device and is situated along the length of the opening 20. The metering shaft is rotatable about an axis that is parallel to the wall ends 19 and is situated elevationally slightly below the hopper opening 20. The shaft 28 is rotatably carried by a bearing means 30 at opposite ends of the hopper along the end walls 21. It is noted, however, that the shaft may be otherwise journaled along its length by appropriate roller mechanisms (not shown).

The metering shaft 28 is driven to rotate about its central axis through a transmission 31 (FIG. 1) and drive mechanism 32. The transmission mechanism is provided to enable selective adjustment of rotational speed of the shaft in response to rotational input of the drive mechanism 32. Transmission 31 can therefore be of the variable pulley type or other appropriate variable speed arrangement.

The drive mechanism 32, as shown in FIG. 1, may be connected to the wheels 12 to drive the transmission 31. Alternatively, the drive 32 can be any selected source of driving energy such as an electric or hydraulic motor. In agricultural applications, it is preferred to drive the metering shaft 28 through the arrangement shown so that discharge of material from the hopper is related directly to the forward progress of the device across a field.

The metering shaft 38 is cylindrical in cross section and substantially spans the width of the opening 20 below hopper 16. The surface of shaft 28 exposed to the hopper interior is relatively smooth, without projections, blades, or vanes that might hamper access to material within the hopper.

A helical feed means 34 is integral with the metering shaft 28 to receive measured amounts of material from the hopper and deposit the measured material into the chute means 24. Two basic forms of the helical feed means 34 are disclosed in the drawings. In the first form (FIGS. 3, 4, 12, 13) at least one helical row of indentations 35 are formed within the periphery of the shaft. The indentations are preferably set into a shallow helical groove 36 (FIGS. 3, 4, and 12) that extends from one end of the shaft to its opposite end. The other form (FIGS. 5, 6–9, 11) is shown with a pair of smooth helical grooves 39 extending from one end of the shaft to the other.

In both forms, the specific size and pitch, as well as the number of indentations and grooves are selected by considering variables such as the type of material to be deposited, the feed rate required, and the rotational speed of the shaft 28. Further, the helical grooves 30 and indentations may be spaced apart axially by annular gaps 28a (FIG. 12) at each of the partitions 26 to avoid shearing action between the shaft 28 and partition walls 26.

The helical feed is arranged so that material will be delivered progressively at an accurately metered rate across the individual manifolds. A bulk charge of material can therefore be delivered in a prescribed succession of small measured component parts to avoid clogging of the spouts 27 and to assure accurate metering through intimate contact with the material within the hopper. Cleanout is facilitated simply by continued operation of the shaft since material will feed continuously through the feed means 34 during operation of the shaft until the hopper completely empties.

The helical row of indentations 35 may be utilized to best advantage in seed planting or in handling particulate material. The individual indentations may be of a size approximating the seed or particulate unit size so that each indentation will receive a single particulate unit. The shallow groove 36 of the FIG. 3 and 12 version allows particulate material or seeds to feed evenly and accurately. In some applications, if the shaft is designed without the shallow groove, two or three of the particulate material units, such as peas, will be partially received within a single indentation. The result is that all three may be swept back into the hopper with none being retained for discharge in the particular indentation. The grooves 36 are kept at a depth less than the largest cross-sectional dimension of the particulate units to assure that material will not feed through the groove.

Figure 12:
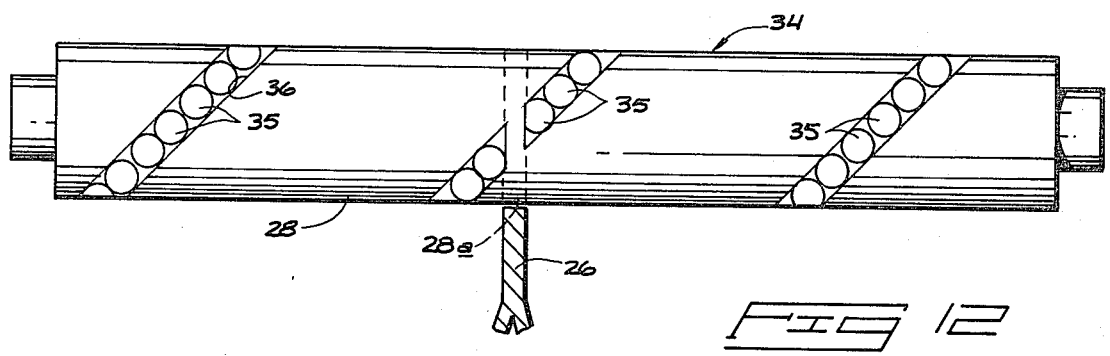
FIG. 12 is a schematized plan view of a metering shaft.
Figure 13:
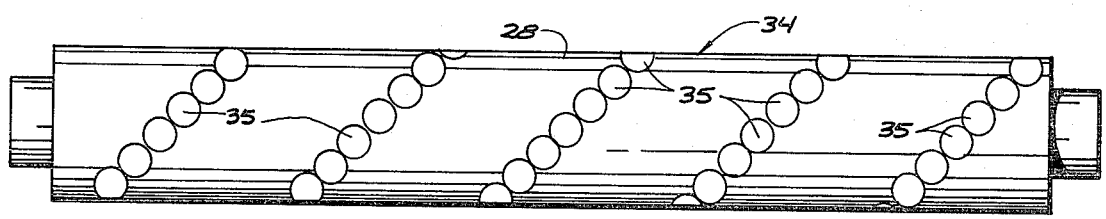
FIG. 13 is an alternate schematized plan view of a metering shaft.

FIGS. 3 and 12 illustrate a single helix formed along the metering shaft. FIGS. 5 and 13 show a double helix. The single helix form allows for smooth, precisely metered feed of material, usually large particulates such as peas that require relatively wide spacing along the ground surface. Smaller particulates and powders that are preferably deposited in closely spaced, measured quantities, are more properly handled by the double helix feed, where twice as much material may be delivered per rotation of the metering shaft. Nevertheless, spacing of the successively deposited units on measured amounts of material remains distinct and accurate.

It is preferred, in the indented form of the helical feed, that an odd number of indentations move past a fixed point for each two or more full revolution, of the metering shaft. This assures that no two indentations will drop a charge of material at the same instant. Clogging of the discharge spools is thereby avoided and accurate, metered dispensation of material is assured. In fact, where alternate angular spacing of indentations is used, precise longitudinal spacing between particulates along each row and transverse spacing between adjacent particulates is possible. For example, rows of seed can be planted with, say, one inch spacing in any direction between adjacent seeds. Such spacing has proven to be effective in increasing production-per-acre but, before now, has not been effectively achieved with an automatic seed drill.

The continuous, helical groove 39 (comprising the second form of feed means 34) is used for metered discharge of relatively fine material such as powdered fertilizer. The open helical groove extends in open communication from the hopper to the manifold. To prevent material from sliding along the grooves from the hopper and into the manifold, I provide side rolls 40 on opposite sides of the shaft 28. The rolls 40 rotate about axes that are parallel the shaft and maintain tangential engagement with the shaft periphery.

Each of the side rolls 40 includes a helical strip 41 for each helical groove 39. The strips 41 are formed of a resilient material and are arranged about a helix corresponding to the helical configuration of a groove 39. The side rolls 40 are connected to the metering shaft 28 through the transmission means 31. They will therefore rotate in response to rotation of the metering shaft. Identical spur gears 33 may be provided for this purpose. The metering shaft will rotate in one direction while the side rolls 40 rotate in opposite directions, maintaining the helical strips 41 in contact within the groove 39 on the metering shaft.

Figure 9:
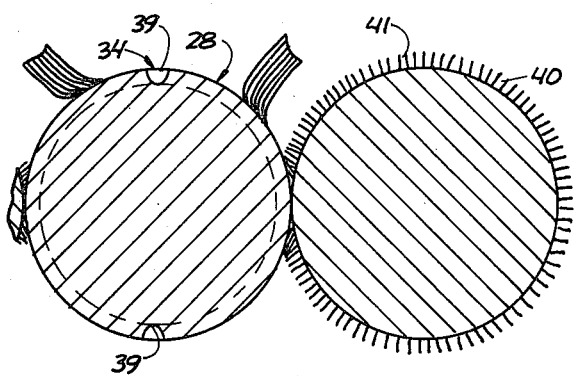
FIG. 9 is a sectional view similar to FIG. 8 only showing an alternate form of strip material on the side rollers.
Figure 10:
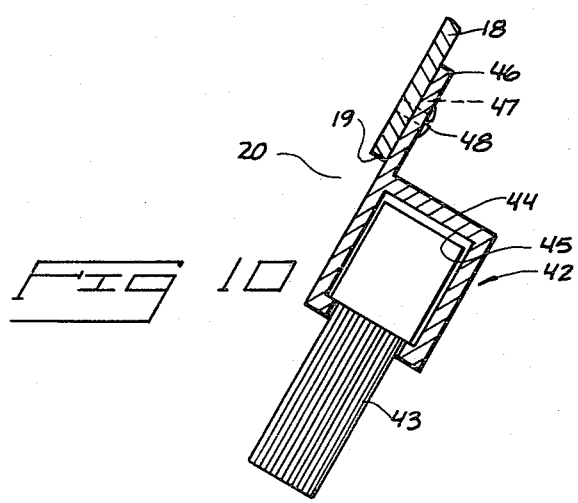
FIG. 10 is an enlarged end sectional view of a wiper and its mounting bracket.

FIG. 9 shows the side rolls with helical strips 41 formed of brush bristles. The bristles extend radially from the side rolls a distance slightly less than the depth of the grooves 39. The bristles are particularly useful when material is being dispensed that would normally have a tendency to pack within the grooves 39.

Figure 8:
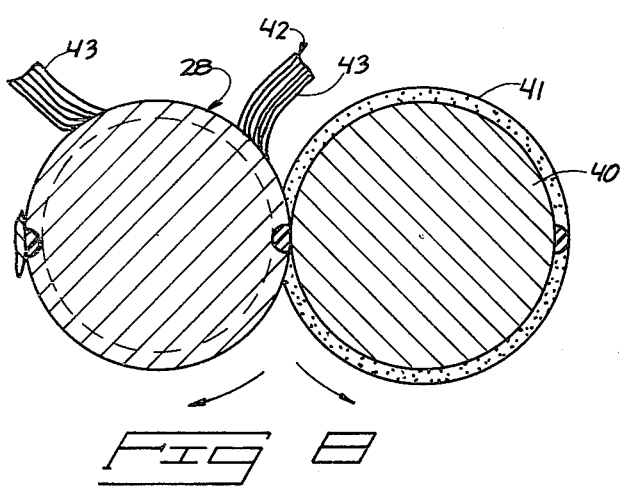
FIG. 8 is an enlarged sectional view taken along line 8—8 in FIG. 7.

Helical strips 41 formed of a solid resilient material such as sponge rubber are shown in FIG. 8. The rubber strips are formed in cross section to conform to the cross-sectional configuration of the mating grooves 39. The flexible strips will compress slightly upon engagement with material in the grooves being moved from within the hopper to an axially disposed position below the hopper where it may fall from the grooves into the adjacent manifold. The rubber strips will preferably be utilized with material of a generally granular nature that would not tend to clog within the grooves 39.

A wiper means 42 is shown in substantial detail by FIGS. 8 through 11. Means 42 extends from hopper 16 to rub against the shaft periphery to prevent escape of material between the hopper bottom ends 19 and the shaft periphery. The wiper means 42 is designed to yieldably rub against the periphery of the metering shaft along its full length. It is preferred that wiper means 42 be comprised of elongated resilient bristle brushes 43. Outward ends of the bristles slidably engage the peripheral surface of the shaft 28.

Figure 11:
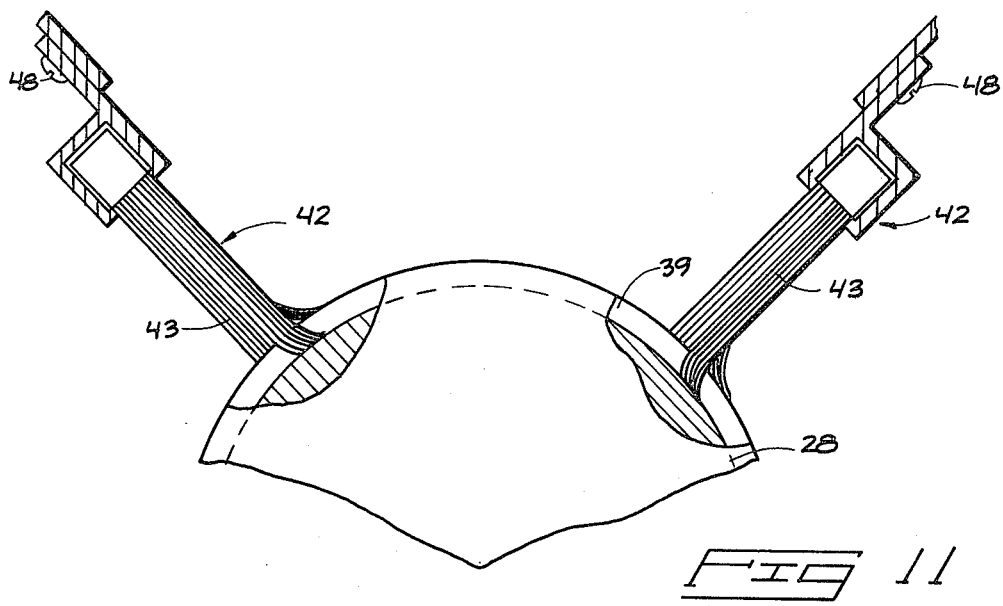
FIG. 11 is an enlarged fragmentary sectional view of a modified form of the wiper means of my invention.

FIG. 11 shows a form of the brushes 43 that is slightly modified to include bristles of two separate lengths. Shorter bristles are provided on the side of the brushes facing the direction of metering shaft rotation. The short bristles rub gently over the peripheral surface of the shaft to substantially seal the cylindrical peripheral shaft surface against undesired seepage of material into the manifolds. Longer bristles extend into the groove and over the periphery to prevent undesired escape of material through the grooves. The longer bristles bend and slide easily over the shaft periphery alongside the grooves to further assist sealing of the hopper.

A bracket 44 is provided to mount each brush 43 to the hopper and to enable axial adjustment of the brushes against the shaft periphery. The brackets include elongated channels 45 for receiving the brushes 43. The brackets also include outwardly projecting flanges 46 having slots 47 that are substantially radially oriented with respect to the axis of the metering shaft 28. Mounting screws 48 extend through the slots and into appropriate apertures in the hopper to adjustably secure the brackets and brushes to the hopper.

Operation of the present invention, in relation to the above description, may now be understood. Firstly, the hopper 16 is filled with a selected loose material to be discharged in metered quantities. The selected material, for example, may be peas, with the dispenser 10 being utilized as a seed planting machine. In this instance, the metering shaft with indentations 35 would be used as the feed means 34.

As the frame 11 is pulled along the ground, rotation of the wheels 12 will cause corresponding rotation of shaft 28 through the transmission 31 and drive mechanism 32. The rate of rotation for the shaft 28 may be selectively determined by the rate of speed in the forward direction or by selectively adjusting the transmission.

As the metering shaft 28 rotates, successive empty indentations 35 are exposed to the contents of the hopper. Each indentation will receive a single pea while the wiper means 42 operates to prevent escape of the remaining peas in the hopper.

Continued rotation of the shaft brings the filled indentations past the wiper means and downwardly where they will fall one-by-one in timed succession into the adjacent manifold. The successive peas will fall at axial spaced intervals along the manifold and at different times due to the angular spacing of the indentations and the helical configuration of the feed means. The continuous helical feed eliminates the chance of a simultaneously discharged group of peas bridging a discharge spout and causing malfunction. The seeds are thus gently and accurately delivered in precise measured quantity to the ground below the hopper.

When it becomes necessary to clean the hopper, the contents may be easily and completely removed. The entire hopper can be emptied simply by rotating the metering shaft 28. The shaft 28 maintains complete engagement with the material in the hopper regardless of the material level. Further, the smooth periphery of the shaft 28 and the wiper means 42 will allow complete access to the hopper interior for unloading purposes.

When fine or powdered material is to be distributed, the shaft 28 having the smooth helical grooves 39 may be utilized in conjunction with the side rolls 40. Here, the powdered material will feed downwardly against the rotating metering shaft with accurately measured amounts being received within the exposed portions of the helical grooves. The material will not drop free of the grooves until it has been rotated beyond tangential engagement with the side rolls 40. The helical strip 41 of each side roll 40 rolls against the material received by the groove to prevent premature escape of the material. The wiper means 42 also functions to prevent escape of material over the shaft periphery and strikes a level of material within the groove 39.

The above description was given by way of example to set forth a preferred form of the present invention. The following claims are intended to more restrict the scope of the invention.

What I claim is:

1. A metered dispenser for agricultural fertilizer or seeds, comprising:
    a hopper having a pair of opposed side walls converging downwardly and terminating at spaced bottom end edges to define a bottom opening that extends across the width of the hopper;
    an elongated metering shaft having a cylindrical periphery formed about a central shaft axis;
    bearing means mounting the metering shaft to the hopper for rotation about the central shaft axis and with the axis extending along the width of the hopper below the bottom opening thereof;
    helical feed means along the periphery of the metering shaft generated about the central metering shaft axis and extending axially along the length thereof for receiving loose material from within the hopper and for discharging the material successively in metered quantity in response to rotation of the metering shaft about its axis, said helical feed means being comprised of a plurality of discrete indentations disposed within the base of a helical groove formed about the cylindrical periphery of the metering shaft;

wiper means on the hopper between the end edges and the metering shaft to slidably engage and wipe over the periphery of the metering shaft along the length thereof; and drive means for rotating the metering shaft about its central shaft axis.

2. The dispenser as defined by claim 1 wherein there are an odd number of indentations for each two or more revolutions of the helical groove.

3. The dispenser as defined by claim 1 wherein the wiper means is comprised of a pair of elongated bristle brushes mounted to the hopper with bristle ends engaging and rubbing against the metering shaft.

4. The dispenser as defined by claim 1 wherein the wiper means is comprised of:

elongated resilient bristle brushes;

brackets mounting the brushes to the hopper adjacent the bottom end edges;

adjustment means mounting the bracket to the hopper for adjustable movement radially with respect to the metering shaft axis.

5. The dispenser as defined by claim 1 wherein said wiper means comprises:

a pair of elongated bristle brushes mounted respectively along the bottom end edges of the pair of hopper side walls, each brush having flexible bristles with free ends engaging the periphery of the metering shaft;

each brush including elongated bristles projecting therefrom a distance sufficient to engage the base of the helical groove.

* * * * *